UNITED STATES PATENT OFFICE.

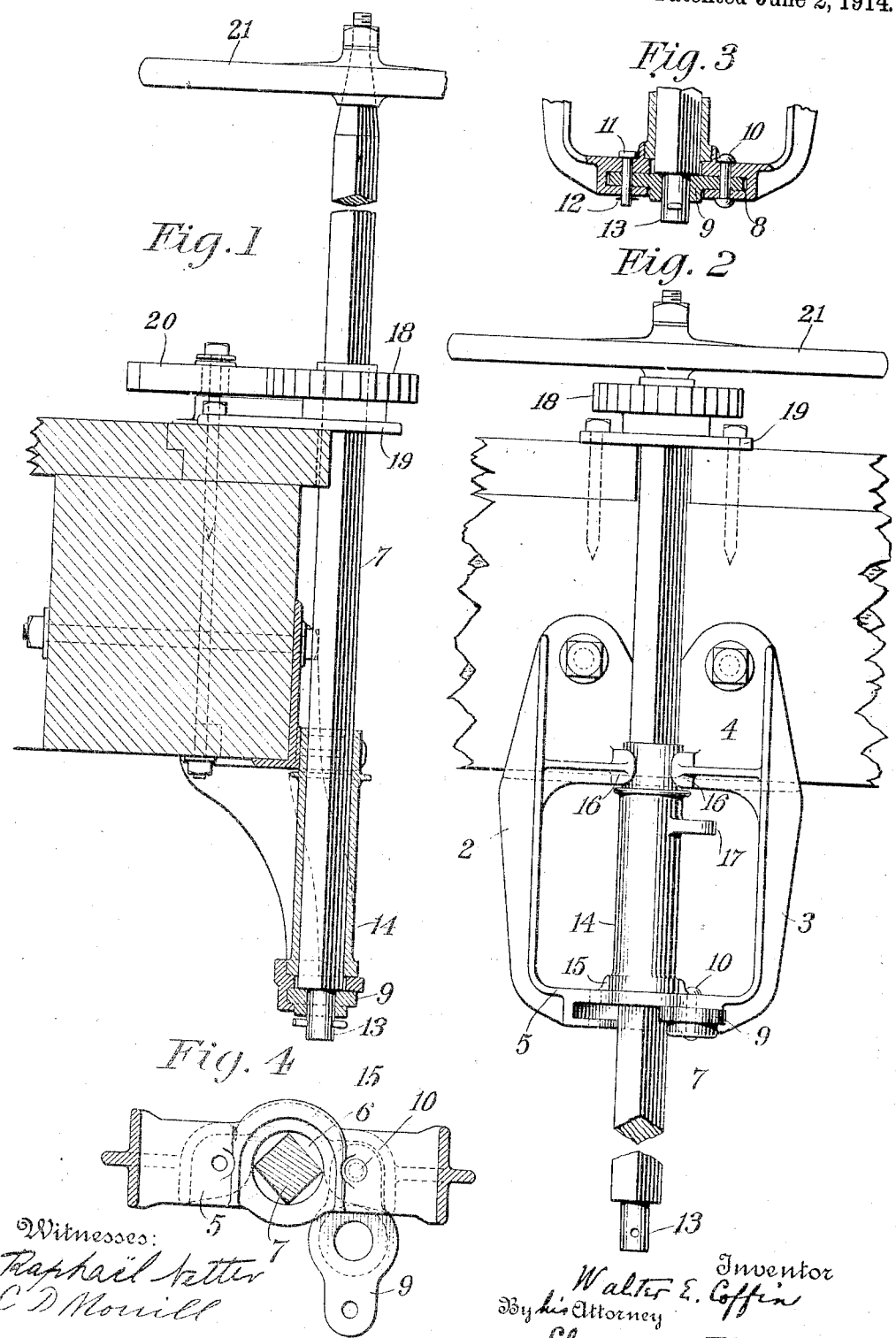

WALTER E. COFFIN, OF CLEVELAND, OHIO, ASSIGNOR TO THE NATIONAL MALLEABLE CASTINGS COMPANY.

HAND BRAKE MECHANISM.

1,098,498.

Specification of Letters Patent.  Patented June 2, 1914.

Application filed December 9, 1912. Serial No. 725,607.

*To all whom it may concern:*

Be it known that I, WALTER E. COFFIN, a citizen of the United States, residing at Cleveland, Cuyahoga county, Ohio, have invented a new and useful Improvement in Hand Brake Mechanisms, of which the following is a specification, reference being had to the accompanying drawings, in which—

Figure 1 is an elevation of my device, partly in section, showing its application to a flat car, and with the brake shaft in normal position; Fig. 2 is a front elevation of my device, showing the brake shaft in lowered position; Fig. 3 is a front elevation of my device, partly in section, with the brake shaft in normal position; and Fig. 4 is a plan of the brake shaft step, partly in section, with the sleeve removed.

My invention relates to hand-operated brake mechanisms and is designed to provide a removable support for the brake shaft, so that the brake shaft and the hand wheel on the head of the shaft may be lowered when desired to prevent interference with logs and like articles which project over the ends of the car, while permitting the mechanism to be operated in the usual manner in the lowered position.

Referring to the drawings, 2 is the brake shaft step, preferably made integral and having a U-shaped frame 3 adapted to be attached to the end sill of the car by the back plate 4. The frame 3 at the center of its base 5 has an aperture 6 sufficiently large for the passage of the brake shaft therethrough, and in the base 5 is a horizontal slot 8 within which is seated a bearing plate 9, one end of which is pivotally secured to the base 5 by a bolt or rivet 10, and the other end of which may be secured by the removable bolt 11, which is held in place by the cotter pin 12. The plate 9 is suitably apertured for reception of the cylindrical lower portion 13 of the brake shaft 7. The main portion of the brake shaft 7 is angular in cross-section and incasing the lower part of this angular portion of the shaft 7 is a sleeve 14. The sleeve 14 is held in position in the brake shaft step 2 by the collar 15, which takes about the lower end of the sleeve, and by the bendable lugs 16, which take about the upper portion of the sleeve. The drum or chain-winding portion of the sleeve 14 has a lug 17, preferably cast integral therewith, which is adapted for attachment of the brake chain thereto, one of the chain links being slipped over the lug 17 and being held thereon by a cotter or any other suitable securing device. The upper end of the brake shaft passes through the ratchet wheel 18, which has an aperture angular in cross-section, similar to the shape of the brake shaft, so that the brake shaft has a positive engagement with the ratchet wheel 18 in all positions. The ratchet wheel 18 is mounted in the usual manner upon the ratchet plate 19, upon which is positioned the usual pawl 20. The numeral 21 indicates the brake wheel suitably mounted on the head of the brake shaft.

When it is desired to lower the brake shaft 7 prior to the loading of the car, the cotter pin at the lower end of the brake shaft is removed, and the brake shaft elevated. The bolt 11 of the bearing plate 9, if it is used, is then removed and the plate is swung outwardly on its pivot 10, as is shown in Fig. 4 and the brake shaft 7 is thereby allowed to slide downwardly within the large aperture 6 in the brake shaft step, as is shown in Figs. 2 and 4, while the sleeve 14 remains in normal position attached to the brake chain and mounted within the brake shaft step 2 and engaging in operative position the brake shaft a little farther up the shaft. Thus, while the brake shaft and the brake wheel are sufficiently lowered to be out of the way of the car lading, a hand control of the brake is assured.

It is obvious that many changes may be made in the device which I have shown and described herein, without departing from my invention, since

What I claim is:

1. In a hand brake mechanism, a brake shaft having a main portion, and a lower portion of less area of cross section than the main portion, a brake shaft step, a member movably mounted thereon and having an aperture adapted to receive the lower portion of the shaft, said member in one position being adapted to support said brake shaft, and being movable to another position to permit said shaft to be lowered.

2. In hand brake mechanism, a brake shaft and a brake shaft stop, the brake shaft step having an aperture therein of greater cross sectional area than the cross-sectional area of the brake shaft, a seating plate secured to the brake shaft step and adapted to support the brake shaft, the said seating plate being adapted to be disengaged from the brake shaft to permit the same to be lowered through the aperture in the brake shaft step.

3. In hand brake mechanism, a brake shaft slidably mounted for vertical endwise movement from an upper to a lower position, a brake shaft step, and a bearing plate movably mounted on said step and adapted to lie across the path of movement of said brake shaft when said shaft is in its upper position, to support said shaft.

4. In hand brake mechanism, a brake shaft mounted for vertical endwise movement, a sleeve having a sliding engagement with said brake shaft, a brake shaft step in which said sleeve and shaft are mounted, and a supporting member pivoted to said step and adapted to be moved in and out of the path of movement of said brake shaft to support said shaft in raised position and to permit it to slide to a lowered position.

5. In hand brake mechanism, a brake shaft mounted for vertical endwise movement, a brake wheel secured upon the upper end of said brake shaft, a brake shaft step, and a pivoted supporting member in said step, the brake shaft being adapted to be supported in raised position by the supporting member and in lowered position by the brake wheel.

WALTER E. COFFIN.

Witnesses:
 CHESTER K. BROOKS,
 HARRY E. ORR.